US012557836B2

(12) United States Patent
Jang et al.

(10) Patent No.: US 12,557,836 B2
(45) Date of Patent: Feb. 24, 2026

(54) AEROSOL-GENERATING ARTICLE AND MANUFACTURING METHOD OF THE SAME

(71) Applicant: KT&G CORPORATION, Daejeon (KR)

(72) Inventors: Seok Su Jang, Daejeon (KR); Dae Nam Han, Seoul (KR); Yong Hwan Kim, Anyang-si (KR); Sung Wook Yoon, Suwon-si (KR); Seung Won Lee, Gwangmyeong-si (KR)

(73) Assignee: KT&G Corporation, Daejeon (KR)

( * ) Notice: Subject to any disclaimer, the term of this patent is extended or adjusted under 35 U.S.C. 154(b) by 541 days.

(21) Appl. No.: 17/800,949

(22) PCT Filed: Jul. 23, 2021

(86) PCT No.: PCT/KR2021/009551
§ 371 (c)(1),
(2) Date: Aug. 19, 2022

(87) PCT Pub. No.: WO2022/039397
PCT Pub. Date: Feb. 24, 2022

(65) Prior Publication Data

US 2023/0073657 A1 Mar. 9, 2023

(30) Foreign Application Priority Data

Aug. 21, 2020 (KR) ........................ 10-2020-0105542

(51) Int. Cl.
*A24D 1/02* (2006.01)
*A24B 15/14* (2006.01)
(Continued)

(52) U.S. Cl.
CPC ................ *A24D 1/02* (2013.01); *A24B 15/14* (2013.01); *A24B 15/167* (2016.11); *A24C 5/01* (2020.01);
(Continued)

(58) Field of Classification Search
CPC .......... A24D 1/02; A24D 1/045; A24D 1/002; A24B 15/167; A24B 15/14; A24C 5/01
See application file for complete search history.

(56) References Cited

U.S. PATENT DOCUMENTS 4,553,556 A 11/1985 Lephardt
2007/0074735 A1 4/2007 Gaworski
(Continued)

FOREIGN PATENT DOCUMENTS

CN 205695718 U 11/2016
CN 107307466 A 11/2017
(Continued)

OTHER PUBLICATIONS

International Search Report for PCT/KR2021/009551 dated Nov. 1, 2021.
(Continued)

*Primary Examiner* — Michael H. Wilson
*Assistant Examiner* — Jennifer A Kessie
(74) *Attorney, Agent, or Firm* — Foley & Lardner LLP

(57) ABSTRACT

The present disclosure provides an aerosol-generating article including an aerosol generator including: an aerosol generator comprising an aerosol-generating material configure to vaporize into an aerosol; a tobacco filling part comprising an inner wrapper on which a plurality of folds are formed, and granules of a tobacco material attached to the plurality of folds such that a tobacco component is added to the aerosol passing through the tobacco filling part; and a thermally conductive wrapper wrapped around at least part of outer surfaces of the aerosol generator and the tobacco filling part, and configured to transmit heat to the aerosol-generating material and the tobacco material.

11 Claims, 3 Drawing Sheets

(51) Int. Cl.

| | |
|---|---|
| ***A24B 15/167*** | (2020.01) |
| ***A24C 5/01*** | (2020.01) |
| ***A24D 1/00*** | (2020.01) |
| ***A24D 1/04*** | (2006.01) |
| ***A24D 1/20*** | (2020.01) |
| ***B31F 1/10*** | (2006.01) |

(52) U.S. Cl.

CPC ............. *A24D 1/002* (2013.01); *A24D 1/045* (2013.01); *A24D 1/20* (2020.01); *B31F 1/10* (2013.01); *B31F 2201/0715* (2013.01)

(56) References Cited

U.S. PATENT DOCUMENTS

| | | | | |
|---|---|---|---|---|
| 2010/0275935 | A1* | 11/2010 | Fiebelkorn | A24D 1/02 131/365 |
| 2015/0027476 | A1 | 1/2015 | Gambs et al. | |
| 2017/0055576 | A1* | 3/2017 | Beeson | A24D 1/02 |
| 2019/0364954 | A1 | 12/2019 | Ademe et al. | |
| 2020/0107574 | A1 | 4/2020 | Inagaki et al. | |
| 2020/0128880 | A1* | 4/2020 | Gage | A24D 1/14 |
| 2021/0227876 | A1 | 7/2021 | Hwang et al. | |

FOREIGN PATENT DOCUMENTS

| | | | |
|---|---|---|---|
| CN | 108143003 | A | 6/2018 |
| CN | 207912030 | U | 9/2018 |
| CN | 111213903 | A | 6/2020 |
| CN | 111436647 | A | 7/2020 |
| WO | WO-2018/083180 | A1 | 5/2018 |
| WO | 2020/009416 | A1 | 1/2020 |
| WO | WO-2020/025738 | A2 | 2/2020 |

OTHER PUBLICATIONS

Written Opinion for PCT/KR2021/009551 dated Nov. 1, 2021.

Extended European Search Report dated Sep. 25, 2023 in European Application No. 21858484.5.

Chinese Office Action on Patent Application No. 202180017264.6 dated Mar. 26, 2025.

Chinese Office Action on CN Patent Application No. 202180017264.6 dated Aug. 29, 2025.

* cited by examiner

[Fig. 1]
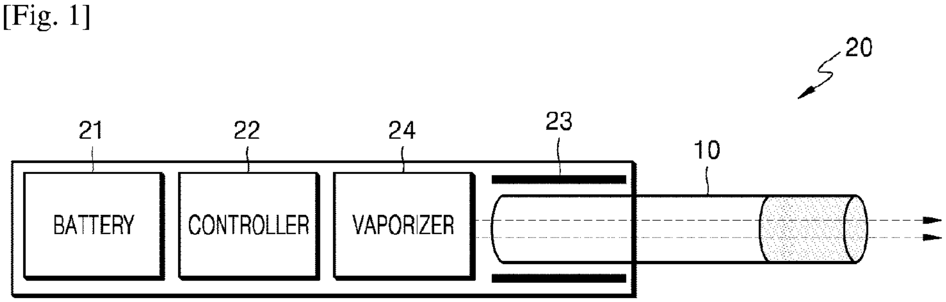
[Fig. 2]
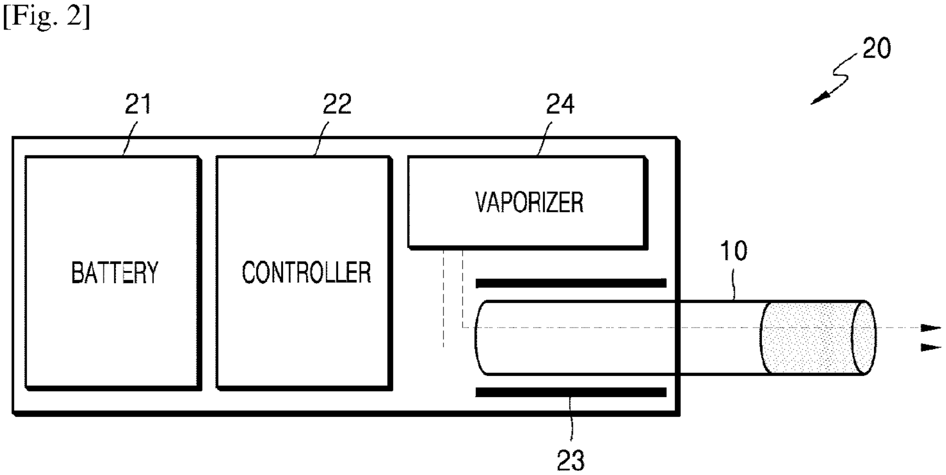
[Fig. 3]
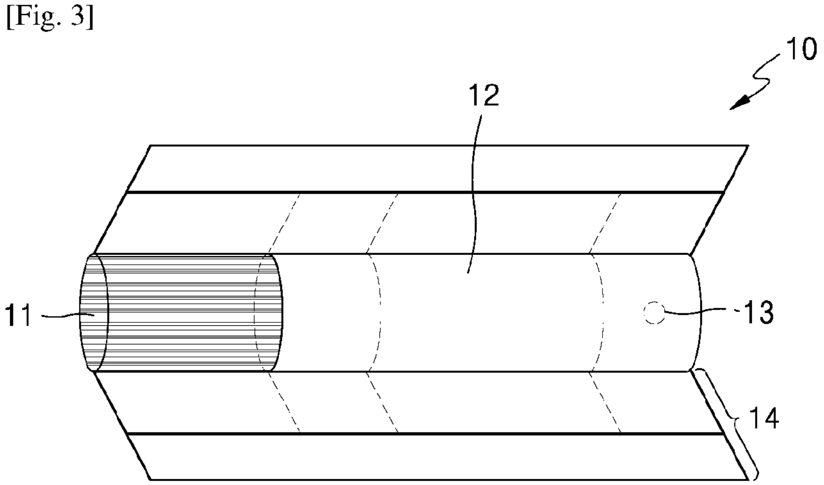
[Fig. 4]
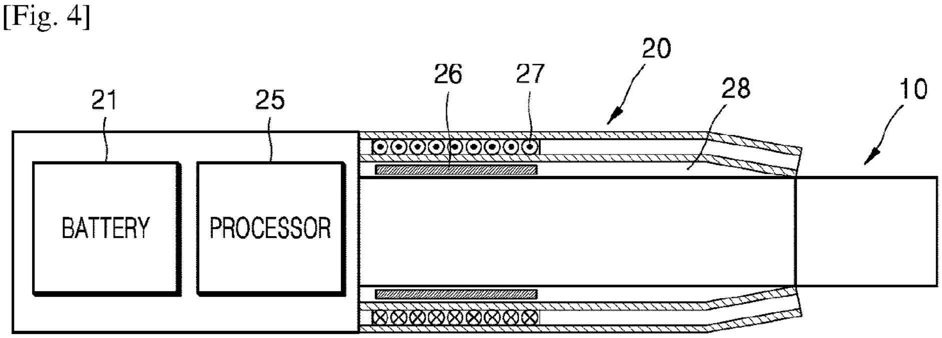

[Fig. 5]
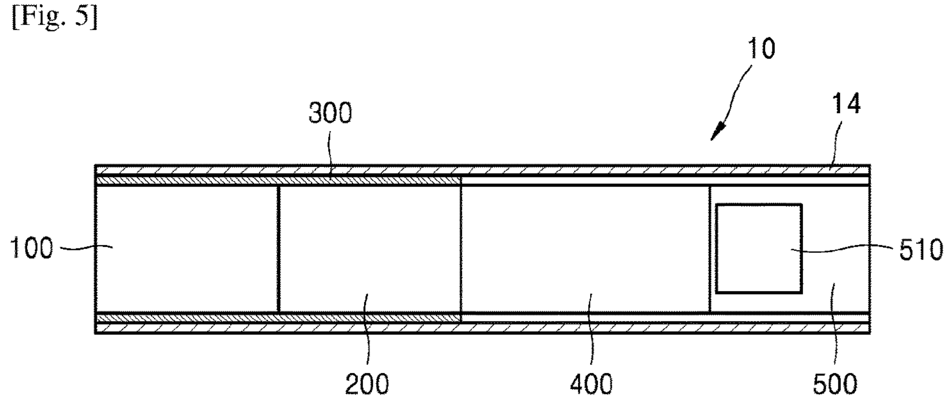
[Fig. 6]
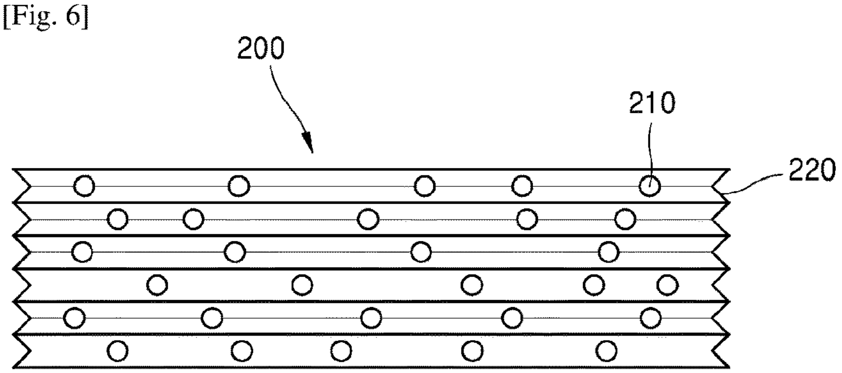
[Fig. 7]
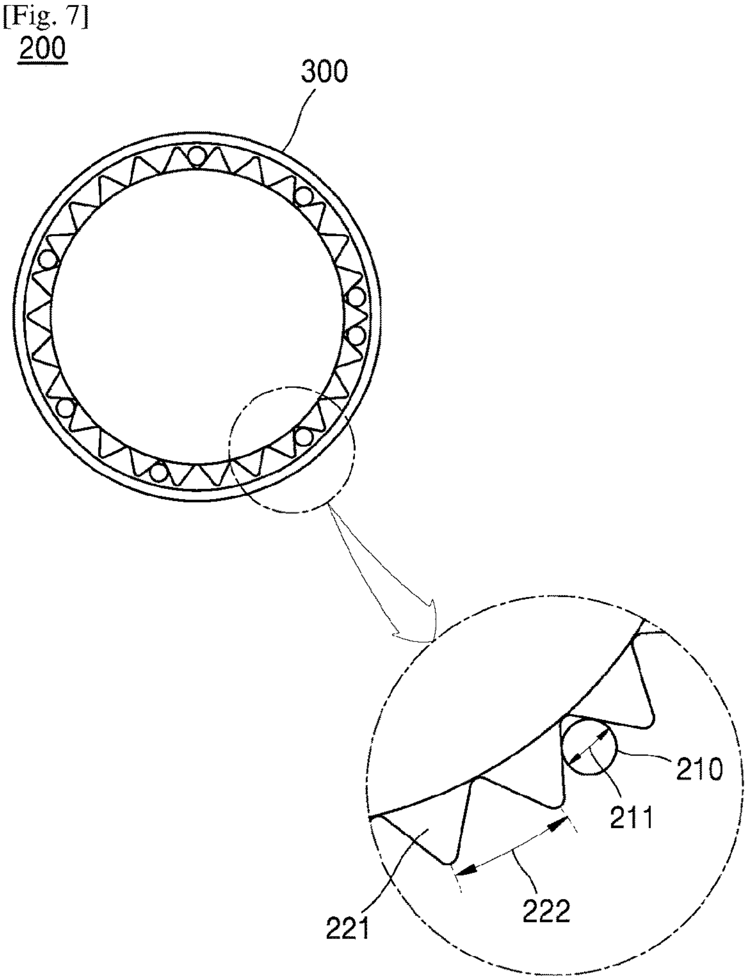

[Fig. 8]
200
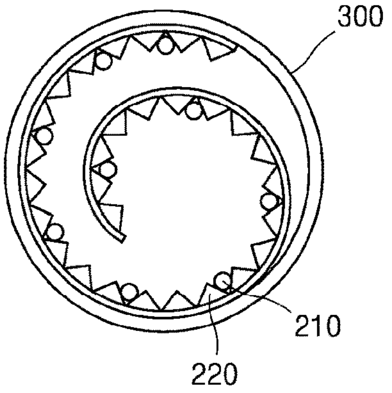
[Fig. 9]
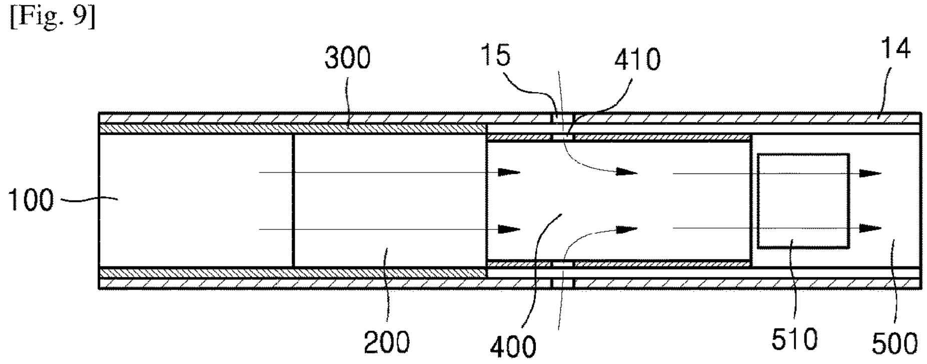
[Fig. 10]
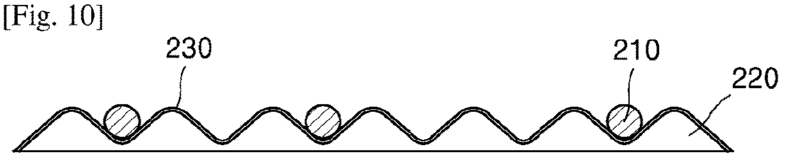
[Fig. 11]
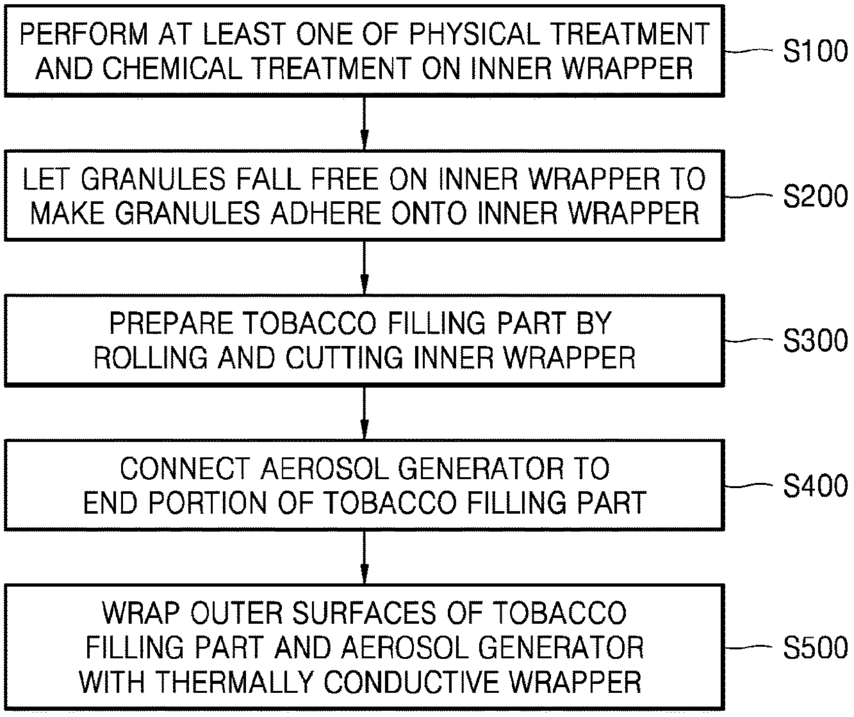

AEROSOL-GENERATING ARTICLE AND MANUFACTURING METHOD OF THE SAME

CROSS REFERENCE TO RELATED APPLICATIONS

This is a National Stage of International Application No. PCT/KR2021/009551 filed Jul. 23, 2021, claiming priority based on Korean Patent Application No. 10-2020-0105542 filed Aug. 21, 2020.

TECHNICAL FIELD

The present disclosure relates to an aerosol-generating and a manufacturing method of the aerosol-generating article.

BACKGROUND ART

Recently, the demand for alternative methods to overcome the disadvantages of traditional cigarettes has increased. For example, there is growing demand for an aerosol generating device which generates aerosol by heating an aerosol generating material in cigarettes, instead of combusting cigarettes.

Some aerosol-generating articles have configurations for generating aerosols by heating a medium and a material added to the medium. For example, the aerosols are generated as reconstituted tobacco leaves or pipe tobaccos in the medium are heated. In the case of the medium formed of reconstituted tobacco leaves or pipe tobaccos, the draw resistance tends to increase when aerosols are generated and flow.

Also, when a tobacco material is provided in the form of particles, the tobacco material may be discharged to the outside of the aerosol-generating article.

DISCLOSURE

Technical Problem

Some aerosol-generating articles have configurations for generating aerosols by heating a medium and a material added to the medium. For example, the aerosols are generated as reconstituted tobacco leaves or pipe tobaccos in the medium are heated. In the case of the medium formed of reconstituted tobacco leaves or pipe tobaccos, the draw resistance tends to increase when aerosols are generated and flow.

Also, when a tobacco material is provided in the form of particles, the tobacco material may be discharged to the outside of the aerosol-generating article.

The technical problems of the present disclosure are not limited to the above-described description, and other technical problems may be derived from the embodiments to be described hereinafter.

Technical Solution

The present disclosure provide an aerosol-generating article including a tobacco filling part, in which folds are formed on an inner wrapper and a tobacco material in the form of granules adhere onto the folds, to solve the problems stated above.

Also, the present disclosure provide a manufacturing method of an aerosol-generating article to which a tobacco material in the form of granules may stably adhere through physical treatment or chemical treatment.

According to an aspect of the present disclosure, an aerosol-generating article includes an aerosol generator including an aerosol-generating material configure to vaporize into an aerosol; a tobacco filling part comprising an inner wrapper on which a plurality of folds are formed, and granules of a tobacco material arranged in the plurality of folds such that a tobacco component is added to the aerosol passing through the tobacco filling part; and a thermally conductive wrapper wrapped around at least part of outer surfaces of the aerosol generator and the tobacco filling part, and configured to transmit heat to the aerosol-generating material and the tobacco material.

Also, according to an aspect of the present disclosure, a manufacturing method of an aerosol-generating article includes performing at least one of physical treatment and chemical treatment on an inner wrapper to improve adhesion of a surface of the inner wrapper; place granules of a tobacco material on the surface of the inner wrapper by free fall such that the granules are attached to the surface of the inner wrapper by adhesion; preparing a tobacco filling part by rolling and cutting the inner wrapper; connecting an aerosol generator to the tobacco filling part; and wrapping, with a thermally conductive wrapper, outer surfaces of the tobacco filling part and the aerosol generator.

The technical problems of the present disclosure are not limited to the above-described description, and other technical problems may be derived from the embodiments to be described hereinafter.

Advantageous Effects

According to the present disclosure, because a tobacco material is provided in the form of granules, the tobacco material may have a high transfer rate of tobacco component, and smoking continuity and may provide an abundant amount of atomization. Also, the tobacco material may be transferred well at a relatively low temperature.

Also, the granules of the tobacco material may stably adhere to the inner wrapper by a plurality folds formed on an inner wrapper and/or by a binder applied on an inner wrapper including a non-tobacco material.

Also, a thickness of a thermally conductive wrapper may be set in an appropriate range according to a granule diameter, and the transfer rate of tobacco component and the smoking continuity may be improved.

However, the effects of the present disclosure are not limited to those stated above and may include all effects that may be inferred from the configurations described below.

DESCRIPTION OF DRAWINGS

FIG. 1 illustrates an example in which a cigarette is inserted into an aerosol-generating device.

FIG. 2 illustrates an example in which a cigarette is inserted into an aerosol-generating device.

FIG. 3 illustrates an example of a cigarette.

FIG. 4 illustrates an example of an aerosol-generating device using an induction heating method.

FIG. 5 is a cross-sectional view of an aerosol-generating article according to an embodiment.

FIG. 6 is an unrolled view of an inner wrapper of a tobacco filling part of FIG. 5.

FIGS. 7 and 8 are examples of a cross-sectional view of the tobacco filling part of FIG. 5.

FIG. 9 illustrates that external air is introduced to a cooler of the aerosol-generating article of FIG. 5.

FIG. 10 illustrates that a binder is applied to an inner wrapper of the tobacco filling part of FIG. 5.

FIG. 11 is a flowchart of a manufacturing method of an aerosol-generating article, according to an embodiment.

BEST MODE

According to an aspect of the present disclosure, an aerosol-generating article includes an aerosol generator comprising an aerosol-generating material configure to vaporize into an aerosol; a tobacco filling part comprising an inner wrapper on which a plurality of folds are formed, and granules of a tobacco material arranged in the plurality of folds such that a tobacco component is added to the aerosol passing through the tobacco filling part; and a thermally conductive wrapper wrapped around at least part of outer surfaces of the aerosol generator and the tobacco filling part, and configured to transmit heat to the aerosol-generating material and the tobacco material.

A diameter of the granules may be about 0.1 mm to about 1.0 mm.

The diameter of the granules be about 0.1 mm to about 0.4 mm, and the thickness of the thermally conductive wrapper may be about 0.6 μm to about 12 μm.

The diameter of the granule may be about 0.5 mm to about 1.0 mm, and the thickness of the thermally conductive wrapper may be about 12 μm to about 20 μm.

A binder may be applied to a surface of the inner wrapper, and the tobacco material may adhere onto the binder. The binder may include glycerin.

The plurality of folds may be formed to extend in a lengthwise direction of the aerosol-generating article to form an air channel.

The roughness of the inner wrapper may be increased through surface reforming such that the granules are attached to a surface of the inner wrapper by adhesion due to the increased roughness.

The plurality of folds of the inner wrapper may have a plurality of bumps formed in a wave shape, and the granules adhere between adjacent bumps.

A material of the inner wrapper may be made of a non-tobacco material.

A width of each of the plurality of folds of the inner wrapper may be about 1.4 times to about 1.6 times the diameter of each granule.

The aerosol-generating article may further include a cooler comprising at least one perforation configured to introduce external air such that the aerosol flowing through the cooler is cooled by the external air; and a filter unit configured to filter the aerosol.

According to another aspect of the present disclosure, a manufacturing method of an aerosol-generating article includes performing at least one of physical treatment and chemical treatment on an inner wrapper to improve adhesion of a surface of the inner wrapper; place granules of a tobacco material on the surface of the inner wrapper by free fall such that the granules are attached to the surface of the inner wrapper by adhesion; preparing a tobacco filling part by rolling and cutting the inner wrapper; connecting an aerosol generator to the tobacco filling part; and wrapping, with a thermally conductive wrapper, outer surfaces of the tobacco filling part and the aerosol generator.

The physical treatment may include forming a plurality of folds on the surface of the inner wrapper with a stamping roller on which a plurality of bumps are formed.

The chemical treatment may include applying a binder to the surface of the inner wrapper.

Mode for Invention

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The term "aerosol generating article" may refer to any product that is designed for smoking by a person puffing on the aerosol generating article. The aerosol generating article may include an aerosol generating material that generates aerosols when heated even without combustion. For example, one or more aerosol generating articles may be loaded in an aerosol generating device and generate aerosols when heated by the aerosol generating device. The shape, size, material, and structure of the aerosol generating article may differ according to embodiments. Examples of the aerosol generating article may include, but are not limited to, a cigarette-shaped substrate and a cartridge. Hereinafter, the term "cigarette" (i.e., when used alone without a modifier such as "general," "traditional," or "combustive") may refer to an aerosol generating article which has a shape and a size similar to those of a traditional combustive cigarette.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIGS. 1 and 2 are diagrams showing examples in which a cigarette is inserted into an aerosol generating device.

Referring to FIGS. 1 and 2, the aerosol generating device 20 may include a battery 21, a controller 22, a heater 23 and a vaporizer 24. Also, the cigarette 10 may be inserted into an inner space of the aerosol generating device 20.

FIGS. 1 and 2 illustrate components of the aerosol generating device 20, which are related to the present embodiment. Therefore, it will be understood by one of ordinary skill in the art related to the present embodiment that other general-purpose components may be further included in the aerosol generating device 20, in addition to the components illustrated in FIGS. 1 and 2.

Also, FIGS. 1 and 2 illustrate that the aerosol generating device 20 includes the heater 23. However, as necessary, the heater 23 may be omitted.

FIG. 1 illustrates that the battery 21, the controller 22, the vaporizer 24 and the heater 23 are arranged in series. Also, FIG. 2 illustrates that the vaporizer 24 and the heater 23 are arranged in parallel. However, the internal structure of the aerosol generating device 20 is not limited to the structures illustrated in FIGS. 1 and 2. In other words, according to the design of the aerosol generating device 20, the battery 21, the controller 22, the heater 23, and the vaporizer 24 may be differently arranged.

When the cigarette 10 is inserted into the aerosol generating device 20, the aerosol generating device 20 may operate the heater 23 and/or the vaporizer 24 to generate aerosol from the cigarette 10 and/or the vaporizer 24. The aerosol generated by the heater 23 and/or the vaporizer 24 is delivered to a user by passing through the cigarette 10.

As necessary, even when the cigarette 10 is not inserted into the aerosol generating device 20, the aerosol generating device 20 may heat the heater 23.

The battery 21 may supply power to be used for the aerosol generating device 20 to operate. For example, the battery 21 may supply power to heat the heater 23 or the vaporizer 24, and may supply power for operating the controller 22. Also, the battery 21 may supply power for operations of a display, a sensor, a motor, etc. mounted in the aerosol generating device 20.

The controller 22 may generally control operations of the aerosol generating device 20. In detail, the controller 22 may control not only operations of the battery 21, the heater 23, and the vaporizer 24, but also operations of other components included in the aerosol generating device 20. Also, the controller 22 may check a state of each of the components of the aerosol generating device 20 to determine whether or not the aerosol generating device 20 is able to operate.

The controller 22 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 23 may be heated by the power supplied from the battery 21. For example, when the cigarette is inserted into the aerosol generating device 20, the heater 23 may be located outside the cigarette. Thus, the heated heater 23 may increase a temperature of an aerosol generating material in the cigarette.

The heater 23 may include an electro-resistive heater. For example, the heater 23 may include an electrically conductive track, and the heater 23 may be heated when currents flow through the electrically conductive track. However, the heater 23 is not limited to the example described above and may include all heaters which may be heated to a desired temperature. Here, the desired temperature may be pre-set in the aerosol generating device 20 or may be set as a temperature desired by a user.

As another example, the heater 23 may include an induction heater. In detail, the heater 23 may include an electrically conductive coil for heating a cigarette in an induction heating method, and the cigarette may include a susceptor which may be heated by the induction heater.

For example, the heater 23 may include a tube-type heating element, a plate-type heating element, a needle-type heating element, or a rod-type heating element, and may heat the inside or the outside of the cigarette 10, according to the shape of the heating element.

Also, the aerosol generating device 20 may include a plurality of heaters 23. Here, the plurality of heaters 23 may be inserted into the cigarette 10 or may be arranged outside the cigarette 10. Also, some of the plurality of heaters 23 may be inserted into the cigarette 10 and the others may be arranged outside the cigarette 10. In addition, the shape of the heater 23 is not limited to the shapes illustrated in FIGS. 1 and 2 and may include various shapes.

The vaporizer 24 may generate aerosol by heating a liquid composition and the generated aerosol may pass through the cigarette 10 to be delivered to a user. In other words, the aerosol generated via the vaporizer 24 may move along an air flow passage of the aerosol generating device 20 and the air flow passage may be configured such that the aerosol generated via the vaporizer 24 passes through the cigarette to be delivered to the user.

For example, the vaporizer 24 may include a liquid storage, a liquid delivery element, and a heating element, but it is not limited thereto. For example, the liquid storage, the liquid delivery element, and the heating element may be included in the aerosol generating device 20 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 24 or may be formed integrally with the vaporizer 24.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 24 may be referred to as a cartomizer or an atomizer, but it is not limited thereto.

The aerosol generating device 20 may further include general-purpose components in addition to the battery 21, the controller 22, the heater 23, and the vaporizer 24. For example, the aerosol generating device 20 may include a display capable of outputting visual information and/or a motor for outputting haptic information. Also, the aerosol generating device 20 may include at least one sensor (e.g., a puff detecting sensor, a temperature detecting sensor, a cigarette insertion detecting sensor, etc.). Also, the aerosol generating device 20 may be formed as a structure that, even when the cigarette 10 is inserted into the aerosol generating device 20, may introduce external air or discharge internal air.

Although not illustrated in FIGS. 1 and 2, the aerosol generating device 20 and an additional cradle may form together a system. For example, the cradle may be used to charge the battery 21 of the aerosol generating device 20. Alternatively, the heater 23 may be heated when the cradle and the aerosol generating device 20 are coupled to each other.

Hereinafter, an example of the cigarette 10 will be described with reference to FIG. 3.

FIG. 3 illustrates an example of the cigarette 10.

The cigarette 10 may be similar to a general combustive cigarette in shape and structure. For example, the cigarette 10 may be divided into a first portion including an aerosol generating material and a second portion including a filter, etc. Alternatively, the second portion of the cigarette 10 may also include an aerosol generating material. For example, an aerosol generating material made in the form of granules or capsules may be inserted into the second portion.

The entire first portion may be inserted into the aerosol generating device 20, and the second portion may be exposed to the outside. Alternatively, only a portion of the first portion may be inserted into the aerosol generating device 20, or the entire first portion and a portion of the second portion may be inserted into the aerosol generating device 20. The user may puff the aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 20. For example, opening and closing of the air passage and/or a size of the air passage formed in the aerosol generating device 20 may be adjusted by the user. Accordingly, the amount and the quality of smoking may be adjusted by the user. As another example, the external air may flow into the cigarette 10 through at least one hole formed in a surface of the cigarette 10.

Referring to FIG. 3, the cigarette 10 may include a tobacco rod 11 and a filter rod 12. The first portion described above may include the tobacco rod 11, and the second portion may include the filter rod 12.

FIG. 3 illustrates that the filter rod 12 includes a single segment. However, the filter rod 12 is not limited thereto. In other words, the filter rod 12 may include a plurality of segments. For example, the filter rod 12 may include a first segment configured to cool an aerosol and a second segment configured to filter a certain component included in the aerosol. Also, as necessary, the filter rod 12 may further include at least one segment configured to perform other functions.

The cigarette 10 may be packaged using at least one wrapper 14. The wrapper 14 may have at least one hole through which external air may be introduced or internal air may be discharged. For example, the cigarette 10 may be packaged by one wrapper 14. As another example, the cigarette 10 may be double-packaged by two or more wrappers 14. For example, the tobacco rod 11 may be packaged by a first wrapper, and the filter rod 12 may be packaged by a second wrapper. Also, the tobacco rod 11 and the filter rod 12, which are respectively packaged by separate wrappers, may be coupled to each other, and the entire cigarette 10 may be packaged by a third wrapper. When each of the tobacco rod 11 or the filter rod 12 is composed of a plurality of segments, each segment may be packaged by separate wrappers. Also, the entire cigarette 10 including the plurality of segments, which are respectively packaged by the separate wrappers and which are coupled to each other, may be re-packaged by another wrapper.

The tobacco rod 11 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 11 may include other additives, such as flavors, a wetting agent, and/or organic acid. Also, the tobacco rod 11 may include a flavored liquid, such as menthol or a moisturizer, which is injected to the tobacco rod 11.

The tobacco rod 11 may be manufactured in various forms. For example, the tobacco rod 11 may be formed as a sheet or a strand. Also, the tobacco rod 11 may be formed as a pipe tobacco, which is formed of tiny bits cut from a tobacco sheet. Also, the tobacco rod 11 may be surrounded by a heat conductive material. For example, the heat conductive material may be, but is not limited to, a metal foil such as aluminum foil. For example, the heat conductive material surrounding the tobacco rod 11 may uniformly distribute heat transmitted to the tobacco rod 11, and thus, the heat conductivity applied to the tobacco rod may be increased and taste of the tobacco may be improved. Also, the heat conductive material surrounding the tobacco rod 11 may function as a susceptor heated by the induction heater. Here, although not illustrated in the drawings, the tobacco rod 11 may further include an additional susceptor, in addition to the heat conductive material surrounding the tobacco rod 11.

The filter rod 12 may include a cellulose acetate filter. Shapes of the filter rod 12 are not limited. For example, the filter rod 12 may include a cylinder-type rod or a tube-type rod having a hollow inside. Also, the filter rod 12 may include a recess-type rod. When the filter rod 12 includes a plurality of segments, at least one of the plurality of segments may have a different shape.

Also, the filter rod 12 may include at least one capsule 13. Here, the capsule 13 may generate a flavor or an aerosol. For example, the capsule 13 may have a configuration in which a liquid containing a flavoring material is wrapped with a film. For example, the capsule 13 may have a spherical or cylindrical shape, but is not limited thereto.

Meanwhile, although not illustrated in FIG. 3, the cigarette 10 according to an embodiment may further include a front-end filter. The tobacco rod 11 may face the filter rod 12 on one side, and face the front-end filter on the opposite side. The front-end filter may prevent the tobacco rod 11 from being detached and prevent the liquefied aerosol from flowing from the tobacco rod 11 into the aerosol generating device (20 of FIGS. 1 and 2), during smoking.

FIG. 4 illustrates an example of an aerosol-generating device using an induction heating method.

Referring to FIG. 4, the aerosol-generating device 20 may include a battery 21, a processor 25, coils 27, and a susceptor 26. Also, at least part of the aerosol-generating article 10 may be accommodated in a hollow 28 of the aerosol-generating device 20. The aerosol-generating article 10, the battery 21, and the processor 25 of FIG. 4 may correspond to the cigarette 10, the battery 21, and the processor 25 of FIGS. 1 to 3, respectively. Also, the coil 27 and the susceptor 26 may correspond to the heater 23. Therefore, the descriptions thereof will not be repeated.

FIG. 4 illustrates that the aerosol-generating device 20 includes components related to the present embodiment. Therefore, it would be understood by one of ordinary skill in the art that other general-purpose components may be further included in the aerosol-generating device 20 in addition to the components shown in FIG. 4.

The coils 27 may be adjacent to the hollow 28. FIG. 4 illustrates that the coils 27 surround the hollow 28, but one or more embodiments are not limited thereto.

When the aerosol-generating article 10 is accommodated in the hollow 28 of the aerosol-generating device 20, the aerosol-generating device 20 may supply power to the coil 27 to make the coil 27 generate a magnetic field. As the magnetic field generated by the coil 27 penetrates the susceptor 26, the susceptor 26 may be heated.

Such induction heating is a well-known phenomenon explained according to Faraday's Law of induction. In detail, when magnetic induction changes in the susceptor 26, an electric field is generated in the susceptor 26, and eddy currents may flow therein accordingly. The eddy currents generate heat in the susceptor 26 proportionally to a current density and resistance of a conductor.

As the susceptor 26 is heated according to the eddy currents and an aerosol-generating material in the aerosol-generating article 10 is heated by the heated susceptor 26, aerosols may be generated. The aerosols generated from the aerosol-generating material may be delivered to the user by passing through the aerosol-generating article 10.

The battery 21 may supply power to make the coil 27 generate the magnetic field. The processor 25 may be electrically connected to the coil 27.

The coil 27 may be an electrically conductive coil for generating a magnetic field by the power supplied from the battery 21. The coil 27 may surround at least part of the hollow 28. The magnetic field generated by the coil 27 may be applied to the susceptor 26 arranged on an inner end portion of the hollow 28.

The susceptor 26 may be heated as the magnetic field generated from the coil 27 penetrates, and may include metal or carbon. For example, the susceptor 26 may include at least one of ferrite, ferromagnetic alloy, stainless steel, and aluminum.

Also, the susceptor 26 may include at least one of ceramic such as graphite, molybdenum, silicon carbide, niobium, nickel alloy, a metal film, or zirconia, transition metal such as nickel (Ni) or cobalt (Co), and a metalloid such as boron (B) or phosphorus (P). However, the susceptor 26 is not limited to the example described above and may include all susceptors which may be heated to a desired temperature. Here, the desired temperature may be pre-set in the aerosol-generating device 20 or may be set as a temperature desired by a user.

When the aerosol-generating article 10 is accommodated in the hollow 28 of the aerosol-generating device 20, the susceptor 26 may surround at least part of the aerosol-generating article 10. Therefore, the heated susceptor 26 may increase a temperature of an aerosol-generating material in the aerosol-generating article 10.

FIG. 4 illustrates that the susceptor 26 surrounds at least part of the aerosol-generating article 10, but one or more embodiments are not limited thereto. For example, the susceptor 26 may include a tube-type heating element, a plate-type heating element, a needle-type heating element, or a rod-type heating element, and may heat the inside or the outside of the aerosol-generating article 10, according to a shape of a heating element.

Also, the aerosol-generating device 20 may include a plurality of susceptors 26. In this case, the plurality of susceptors 26 may be inserted into the aerosol-generating article 10 or may be arranged outside the aerosol-generating article 10. Also, some of the plurality of susceptors 26 may be inserted into the aerosol-generating article 10, and the others may be arranged outside the aerosol-generating article 10. Also, the shape of the susceptor 26 is not limited to the shape illustrated in FIG. 4 and may include various shapes.

FIG. 5 is a cross-sectional view of the aerosol-generating article 10 according to an embodiment. The aerosol-generating article 10 of FIG. 5 may correspond to the cigarette of FIGS. 1 to 3. Therefore, the descriptions provided regarding the cigarette 10 will not be repeated.

Referring to FIG. 5, the aerosol-generating article 10 may include a plurality of different sections, such as an aerosol generator 100, a tobacco filling part 200, and a thermally conductive wrapper 300.

The aerosol generator 100 may be an aerosol-generating material section. That is, the aerosol generator 100 may include an aerosol-generating material which may be vaporized into aerosols. For example, the aerosol generator 100 may include propylene glycol or a mixture of glycerin and propylene glycol.

The tobacco filling part 200 may be a tobacco filler section. That is, the tobacco filling part 300 may be configured to add a tobacco component to the generated aerosol. The tobacco filling part 200 may include an inner wrapper 220 and tobacco materials 210 made in the form of granules (see FIG. 6). The tobacco material 210 may adhere in the form of granules onto a surface of the inner wrapper 220, and while the granules adhere onto the surface, the inner wrapper 220 may be rolled.

The surface of the inner wrapper 220 may include a plurality of folds 221 formed through crimping (see FIG. 7). The tobacco material 210 in the form of granules may adhere between adjacent bumps formed by the plurality of folds 221. The inner wrapper 220 may include a non-tobacco material that does not include a tobacco component. For example, the inner wrapper 220 may include paper.

The tobacco material 210 may be made in the form of regular or irregular granules. When the tobacco material 210 is made in the form of irregular granules, a diameter 211 of each tobacco material 210 may not be uniform, and the tobacco material 210 may have two or more diameters.

The tobacco material 210 in the form of granules may be cheaper and remove fewer aerosols than reconstituted tobacco leaves or pipe tobaccos, thereby realizing abundant atomization. Compared to general reconstituted tobacco leaves or pipe tobaccos, the granules have a larger amount of tobacco materials 210 included in the same weigh or volume.

Also, the tobacco material 210 having the granule form has a large specific surface area and thus may provide enough tobacco components even at a low temperature. Therefore, because the transfer rate of tobacco component is excellent even at a low temperature, the tobacco components may be sufficiently provided to the aerosol. A general aerosol-generating article 10 requires a heating temperature of about 300° C. or higher, but the tobacco material 210 having the granule form may sufficiently provide the tobacco components at a heating temperature of about 250° C. or higher. Therefore, when the aerosol-generating article 10 is used with the aerosol-generating device 20 including the heater 23, the heater 23 may heat at a relatively low temperature, and thus, the power of the battery 21 may be saved.

While connected to each other, the aerosol generator 100 and the tobacco filling part 200 may be wrapped by an outer wrapper 14. As shown in FIG. 5, the aerosol generator 100 may be connected to a front end of the tobacco filling part 200, but it is not limited thereto. The aerosol generated by the aerosol generator 100 may be introduced to the tobacco filling part 200, and while passing through the tobacco filling part 200, the aerosol may absorb the tobacco components from the tobacco material 210 in the form of granules to deliver the tobacco components to the user.

The tobacco material 210 having the granule form may physically adhere to the folds 221 formed on the inner wrapper 220. Because the granules are firmly seated in the curves (i.e., between the bumps) formed by the folds 221, the separation of the tobacco material 221 from the inner wrapper 220 may be prevented even in the case of shaking of the aerosol-generating article 10 or external impact applied to the aerosol-generating article 10.

The thermally conductive wrapper 300 may include a thermally conductive material and transmit heat. The thermally conductive wrapper 300 may be wrapped around at least part of outer circumferential surfaces of the aerosol generator 100 and the tobacco filling part 200 and thus may transmit heat to the aerosol-generating material in the aerosol generator 100 and the tobacco material 210 in the tobacco filling part 200. The thermally conductive material may include, for example, metal such as aluminum. Also, the thermally conductive material may include a material having high heat conductivity, such as a polymer composite. By adjusting the content of the thermally conductive material in the thermally conductive wrapper 300, the heat conductivity of the thermally conductive wrapper 300 may be adjusted, and thus eventually the transfer rate of tobacco component may be adjusted. The aerosol generator 100 and the tobacco filling part 200 may be wrapped by the thermally conductive wrapper 300, and may be inserted into an induction heating type aerosol-generating device 20 of FIG. 4.

Also, the aerosol-generating article 10 may further include a cooler 400 and a filter unit 500.

The cooler 400 may be a cooling section for cooling an aerosol. A hollow may be formed in the cooler 300, and aerosols may flow through the hollow. Also, the cooler 400 may include at least one perforation 410 (see FIG. 9) through which external air is introduced. The external air may be introduced to the cooler 400 through the perforation 410, and thus, the aerosol may be cooled. The cooler 400 may include paper or an acetate tube filter and may include a biodegradable polymer material. For example, the cooler 400 may include pure polylactic acid (PLA) alone, but the material for forming the cooler 400 is not limited thereto.

Also, PLA may be inserted into the cooler 400 as a separate segment or a thread. In this case, aerosols may be less diluted with the air and thus a sufficient amount of atomization may be generated. Also, cooling effects may increase.

The filter unit 500 may include a filter through which an aerosol flows and is filtered. The filter may be a cellulose acetate filter having a plurality of holes. Also, the filter may include a flavoring material 510 adding a flavor to an aerosol. For example, a flavoring liquid may be sprayed to the filter unit 500, or a separate fiber coated with the flavoring material 510 may be inserted into the filter unit 500. Also, the flavoring material 510 may be directly spread on the filter unit 500.

The aerosol-generating article 10 according to an embodiment may include the aerosol generator 100, the tobacco filling part 200, the cooler 400, and the filter unit 500, which are arranged in the stated order. The aerosol may be generated through vaporization of the aerosol-generating material in the aerosol generator 100, and the generated aerosol may flow to the tobacco filling part 200. The tobacco component may be added to the aerosol by the tobacco material 210 when the aerosol passes through the tobacco filling part 200. After the tobacco component is added, a temperature of the aerosol may decrease while the aerosol flows in the cooler 400. After passing through the filter unit 500, the aerosol may be discharged to the outside. The user may inhale the aerosol that have passed through the filter unit 500. However, the processes are not limited to the order stated above and may be performed in any suitable order. Also, any one of the filter unit 500 and the cooler 400 may be omitted, and a plurality of identical segments may be connected.

FIG. 6 is an unrolled view of the inner wrapper 220 of the tobacco filling part 200 of FIG. 5.

Referring to FIG. 6, the tobacco material 210 in the form of granules may adhere between the folds 221 of the inner wrapper 220. The folds 221 formed on the inner wrapper 220 may have various patterns that cause the tobacco material 210 in the form of granules to adhere to the inner wrapper 220. The folds 221 may be formed in parallel with or perpendicularly to a direction in which the aerosol flows or may be spirally formed.

When passing through the tobacco filling part 200, the aerosol may flow between the folds 221. That is, when the aerosol generated from the aerosol-generating material passes through the tobacco filling part 200, the folds 221 may form an air channel on the inner wrapper 220, and thus the aerosol may flow through the air channel. In this case, the folds 221 may be formed to extend in a lengthwise direction of the aerosol-generating article 10 (i.e., a direction in which the aerosol-generating article 10 extends). In the case of a tobacco material formed of a reconstituted tobacco sheet or a pipe tobacco, the tobacco material may block an aerosol flow, and thus draw resistance may increase. According to the present disclosure, however, the folds 221 may function as the air channel, and thus, the aerosol may more smoothly flow than in the tobacco material formed of the reconstituted tobacco sheet or the pipe tobacco.

In the case of the tobacco material 210 in the form of granules, the diameter 211 of the granule may correlate with the smoking continuity and the transfer rate of tobacco component.

The smoking continuity represents the ability of supplying a uniform amount of tobacco components from beginning to end of the use of the aerosol-generating article 10. Therefore, low smoking continuity indicates that the tobacco components are sufficiently provided initially by the aerosol-generating article 10 but the amount of tobacco components may decrease as smoking progresses.

A transfer rate of tobacco component represents content of a tobacco component in the aerosol that is provided by a user's puff When the transfer rate of tobacco component is low, the supply amount of tobacco components included in the aerosol is low during the user's puff, and thus, a smoking sensation may not be satisfactory to the user.

In terms of smoking continuity, as the diameter 211 of the granule of the tobacco material 210 increases, the amount of tobacco materials 210 filled in the tobacco filling part 200 increases such that the smoking continuity may increase. On the contrary, in terms of the transfer rate of tobacco component, as the diameter 211 of the granule decreases, a filling density of the granules in the tobacco filling part 200 increases such that the transfer rate of tobacco component may increase. Therefore, when the diameter 211 of the granule is too large, the transfer rate of tobacco component may fall short, and when the diameter 211 is too small, the smoking continuity may be insufficient. It is preferable that the diameter 211 of the granule is sized to have appropriate smoking continuity and an appropriate transfer rate of tobacco component. To this end, the diameter 211 of the granule may range from about 0.1 mm to about 1.0 mm.

As the thickness of the thermally conductive wrapper 300 increases, the amount of thermally conductive materials in the thermally conductive wrapper 300 also increases, and thus the amount of heat transmitted to the tobacco filling part 200 may increase. Accordingly, the smoking continuity may increase as the thickness of the thermally conductive wrapper 300 increases. However, as the thickness of the thermally conductive wrapper 300 increases, it becomes more difficult to roll the thermally conductive wrapper 300 in a circular shape, thereby making it difficult to manufacture the thermally conductive wrapper 300. Therefore, the thermally conductive wrapper 300 is required to have a certain size to sufficiently transfer the tobacco component and to be easily manufactured. Preferably, the thickness of the thermally conductive wrapper 300 may be less than or equal to about 20 μm.

The diameter 211 of the granule may correlate with the thickness of the thermally conductive wrapper 300. The diameter 211 of the granule may range from about 0.1 mm to about 1.0 mm, and the thickness of the thermally conductive wrapper 300 may be appropriately determined according to the diameter 211 of the granule.

When the diameter 211 of the granule ranges from about 0.1 mm to about 0.4 mm, the thickness of the thermally conductive wrapper 300 may range from about 0.6 μm to about 12 μm. When the diameter 211 of the granule ranges from about 0.5 mm to about 1.0 mm, the thickness of the thermally conductive wrapper 300 may range from about 12 μm to about 20 μm.

FIGS. 7 and 8 are cross-sectional views of the tobacco filling part 200 of FIG. 5. In detail, FIGS. 7 and 8 are longitudinal cross-sectional views of the tobacco filling part 200 including the inner wrapper 220 onto which the tobacco material 210 in the form of granules adheres.

Referring to FIG. 7, the folds 221 of the inner wrapper 220 may be formed by crimping. On the surface of the inner wrapper 220, bumps may be repeatedly formed in the shape of waves. The tobacco material 210 in the form of granules may adhere between the bumps. The inner wrapper 220 may be rolled and cut while the tobacco material 210 adheres onto the inner wrapper 220, and then the tobacco material 210 may be wrapped by the thermally conductive wrapper 300.

The granules need to stably adhere between the folds 221 of the inner wrapper 220, and thus, the diameter 211 of the granule is required to be appropriately decided in relation to the width 222 of the fold 221. When the diameter 211 of the granule is too large, the granules may not be inserted between the folds 221, and when the diameter 211 is too small, the granules may be separated from the folds 221.

To this end, the width 222 of the fold 221 (i.e., a distance between two adjacent ridges) may be about 1.4 times to about 1.6 times the diameter 211 of the granulestably adhere. For example, the width 222 of the fold 221 may be about 1.5 times the diameter 211 of the granule. When the width 222 of the fold 221 is about 1.4 times to about 1.6 times the diameter 211 of the granule, the tobacco material 210 in the form of granules may be stably adhere to the folds 221.

Also, the roughness of the surface of the inner wrapper 220 may be adjusted through reforming to enable the tobacco material 210 in the form of granules to stably adhere onto the surface of the inner wrapper 220. When the surface of the inner wrapper 220 is roughened through the reforming, fine irregularities, grooves, etc. may be formed. Accordingly, the friction on the surface of the inner wrapper 220 may increase, and thus the granules may stably adhere. Referring to FIG. 8, the inner wrapper 220 may be rolled so that the surface, to which the tobacco material 210 in the form of granules adheres, faces the inside. Also, the inner wrapper 220 may be rolled such that multiple layers of the inner wrapper 200 are formed in the longitudinal cross section of the tobacco filling part 200.

FIG. 9 illustrates that external air is introduced to the cooler 400 of the aerosol-generating article 10 of FIG. 5.

As described above, the cooler 400 may include the perforation 410 through which the external air is introduced. When an aerosol flows, the aerosol may be mixed with the external air, and thus a temperature of the aerosol may decrease. A hole 15, through which external air flows in, may be formed in the outer wrapper 14 at a location corresponding to a location where the perforation 410 is formed.

FIG. 10 illustrates that a binder 230 is applied on the inner wrapper 220 of the tobacco filling part 200 of FIG. 5.

Referring to FIG. 10, the binder 230 may be applied to the surface of the inner wrapper 220 such that the tobacco material 210 may adhere onto the binder 230. The binder 230 may be a material having adhesion and applied to the surface of the inner wrapper 220, thus the granules may adhere to the surface of the inner wrapper 200 because of the adhesion of the binder 230. For example, the binder 230 may include a moisturizer containing glycerin, or a flavoring additive. The tobacco material 210 in the form of granules may stably adhere onto the inner wrapper 220 by the binder 230.

The aerosol-generating article 10 according to an embodiment may be inserted into an aerosol-generating device and used. When the aerosol-generating article 10 is inserted into the aerosol-generating device, the heat may be transmitted to the thermally conductive wrapper 300 by a heater and/or a vaporizer. Because the thermally conductive wrapper 300 is wrapped around at least part of the outer circumferential surfaces of the aerosol generator 100 and the tobacco filling part 200, heat from the heater and/or the vaporizer may be transmitted to the aerosol-generating material and the tobacco material 210. In this case, the heater 23 included in the aerosol-generating device may be inserted into the aerosol-generating article 10 and may heat the same. The heater 23 may also heat the aerosol-generating article 10 from the outside of the aerosol-generating article 10. The heater 23 may heat the aerosol-generating article 10 according to an induction heating method.

FIG. 11 is a flowchart of a manufacturing method of the aerosol-generating article 10 according to an embodiment.

Referring to FIG. 11, the manufacturing method of the aerosol-generating article 10 may include operation S100 in which at least one of physical treatment and chemical treatment is performed on the inner wrapper 220. The physical treatment or the chemical treatment allows the tobacco material 210 in the form of granules to stably adhere.

For example, the physical treatment may be performed by forming the folds 221 on the surface of the inner wrapper 220. The inner wrapper 220 including a non-tobacco material such as paper may be prepared. For example, the folds 221 may be formed by rolling the inner wrapper 220 with a stamping roller including bumps formed on a surface thereof.

For example, the chemical treatment may be performed by applying the binder 230 having adhesion on the surface of the inner wrapper 220. The binder 230 may include, for example, a moisturizer including glycerin.

In operation S200, after the physical or chemical treatment is performed on the inner wrapper 220, a tobacco material in the form of granules may fall free on the surface of the inner wrapper 220, and thus, the granules may adhere. The tobacco material having the granule form may not well adhere to the inner wrapper 220 because of static electricity. In this respect, the tobacco material 210 having the granule form may fall free on the surface of the inner wrapper 220 to make the tobacco material 210 adhere uniformly and stably.

In operation S300, the tobacco filling part 200 may be prepared by rolling and cutting the inner wrapper 220 to which the tobacco material 210 having the granule form adheres. The tobacco filling part 200 may be completed when the inner wrapper 220, to which the granules adhere, is rolled inwards and cut in an appropriate size.

In operation S400, the aerosol generator 100 may be connected to an end portion of the completed tobacco filling part 200. The aerosol generator 100 is connected to the tobacco filling part 200 so that an aerosol generated by the aerosol generator 100 may flow to the tobacco filling part 200.

In operation S500, while the tobacco filling part 200 is connected to the aerosol generator 100, outer circumferential surfaces of the aerosol generator 100 and the tobacco filling part 200 may be wrapped by the thermally conductive wrapper 300. Therefore, the aerosol generator 100 and the tobacco filling part 200 for the aerosol-generating article 10 may be manufactured.

Those of ordinary skill in the art related to the present embodiments may understand that various changes in form and details can be made therein without departing from the scope of the characteristics described above. Therefore, the disclosed methods should be considered in a descriptive point of view, not a restrictive point of view. The scope of the present disclosure is defined by the appended claims rather than by the foregoing description, and all differences within the scope of equivalents thereof should be construed as being included in the present disclosure.

What is claimed is:

1. An aerosol-generating article comprising:

an aerosol generator comprising an aerosol-generating material configure to vaporize into an aerosol;

a tobacco filling part comprising an inner wrapper on which a plurality of folds are formed, and granules of a tobacco material attached between the plurality of folds such that a tobacco component is added to the aerosol passing through the tobacco filling part; and a thermally conductive wrapper wrapped around at least part of outer surfaces of the aerosol generator and the tobacco filling part, and configured to transmit heat to the aerosol-generating material and the tobacco material, wherein in a longitudinal cross-sectional view of the tobacco filling part, the plurality of folds of the inner wrapper have a plurality of bumps formed in a wave shape, and the granules adhere between adjacent bumps.

2. The aerosol-generating article of claim 1, wherein a diameter of the granules is about 0.1 mm to about 1.0 mm.

3. The aerosol-generating article of claim 1, wherein a diameter of the granules is about 0.1 mm to about 0.4 mm, and a thickness of the thermally conductive wrapper is about 0.6 gm to about 12 gm.

4. The aerosol-generating article of claim 1, wherein a diameter of the granules is about 0.5 mm to about 1.0 mm, and a thickness of the thermally conductive wrapper is about 12 gm to about 20 gm.

5. The aerosol-generating article of claim 1, wherein a binder is applied to a surface of the inner wrapper, and the tobacco material adheres onto the binder.

6. The aerosol-generating article of claim 5, wherein the binder comprises glycerin.

7. The aerosol-generating article of claim 1, wherein the plurality of folds are formed to extend in a lengthwise direction of the aerosol-generating article to form an air channel.

8. The aerosol-generating article of claim 1, wherein a roughness of the inner wrapper is increased through surface reforming such that the granules are attached to a surface of the inner wrapper by adhesion due to the increased roughness.

9. The aerosol-generating article of claim 1, wherein the inner wrapper is made of a non-tobacco material.

10. The aerosol-generating article of claim 1, wherein a width of each of the plurality of folds is about 1.4 times to about 1.6 times a diameter of each of the granules.

11. The aerosol-generating article of claim 1, further comprising:

a cooler comprising at least one perforation configured to introduce external air such that the aerosol flowing through the cooler is cooled by the external air; and a filter unit configured to filter the aerosol.

* * * * *